US011082916B2

United States Patent
Welle et al.

(10) Patent No.: US 11,082,916 B2
(45) Date of Patent: Aug. 3, 2021

(54) LOW POWER GATEWAY

(71) Applicant: VEGA GRIESHABER KG, Wolfach (DE)

(72) Inventors: Roland Welle, Hausach (DE); Joerg Boersig, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 2 days.

(21) Appl. No.: 16/781,852

(22) Filed: Feb. 4, 2020

(65) Prior Publication Data
US 2020/0252867 A1 Aug. 6, 2020

(30) Foreign Application Priority Data

Feb. 4, 2019 (EP) ...................................... 19155311

(51) Int. Cl.
*H04W 52/02* (2009.01)
*H04W 88/16* (2009.01)
*H04W 84/18* (2009.01)
*H04W 4/38* (2018.01)

(52) U.S. Cl.
CPC ....... *H04W 52/0203* (2013.01); *H04W 88/16* (2013.01); *H04W 4/38* (2018.02); *H04W 84/18* (2013.01); *Y02D 30/70* (2020.08)

(58) Field of Classification Search
CPC .............. G05B 19/0423; H04W 52/02; H04W 52/0203; H04W 84/18; H04W 88/16; H04W 52/0274; H04W 52/028; H04W 4/38; G06F 1/3203; Y02D 30/70
See application file for complete search history.

(56) References Cited

U.S. PATENT DOCUMENTS

| | | | | |
|---|---|---|---|---|
| 7,114,388 B1 * | 10/2006 | French | ................... | G01W 1/00 73/170.16 |
| 7,277,414 B2 * | 10/2007 | Younis | ................... | G01D 9/005 370/311 |
| 7,539,888 B2 * | 5/2009 | Hu | ................... | H04L 12/40039 713/320 |
| 7,564,810 B2 * | 7/2009 | Hernandez | ........ | H04W 52/0232 370/311 |
| 8,331,282 B2 * | 12/2012 | Pandey | ................. | H04W 72/02 370/322 |
| 2014/0081518 A1 | 3/2014 | Son | | |

(Continued)

FOREIGN PATENT DOCUMENTS

DE 10 2016 209 837 A1 12/2017
DE 10 2016 125 169 A1 6/2018

*Primary Examiner* — Ahmed Elallam
(74) *Attorney, Agent, or Firm* — Oblon, McClelland, Maier & Neustadt, L.L.P.

(57) ABSTRACT

Described herein is a gateway for sensor data forwarding, including first communication circuitry adapted to receive sensor data from at least one sensor data source, processing circuitry connected to the first communication circuitry and adapted to collect and buffer the sensor data and to execute programs, which map a communication protocol, second communication circuitry connected to the processing circuitry and arranged for transmitting the collected and buffered sensor data, wherein the processing circuitry is arranged to switch on the second communication circuitry for transmitting the collected data and to switch the second communication circuitry off after transmitting the collected data.

15 Claims, 5 Drawing Sheets

(56) References Cited

U.S. PATENT DOCUMENTS

| | | |
|---|---|---|
| 2015/0043411 A1 | 2/2015 | Kim et al. |
| 2015/0139198 A1 | 5/2015 | Hwang et al. |
| 2018/0206187 A1 | 7/2018 | Savolainen et al. |
| 2019/0059050 A1* | 2/2019 | Fuleshwar Prasad ........................ H04W 52/0203 |

* cited by examiner

LOW POWER GATEWAY

CROSS-REFERENCE TO RELATED APPLICATIONS

This application claims the benefit of the filing date of European Patent Application No. 19 155 311.4 filed on 4 Feb. 2019, the entire contents of which is incorporated herein by reference.

FIELD

The disclosure relates to a low-power gateway that receives and transmits sensor data and a method for transmitting sensor data.

TECHNICAL BACKGROUND

Gateways are used to receive and forward data, whereby the communication protocols for receiving and sending can be different. The data sources may be a local computer or sensors, and the data sink may be a remote computer, e.g. a server connected to the gateway via the Internet or mobile communications. The interfaces can be wired or wireless on both sides.

The energy to operate a gateway is usually drawn from the power supply system, so that despite possible wireless interfaces, flexibility is not satisfactory. Alternatively, a gateway may also be battery powered, but due to the usual power consumption of a gateway, this may require frequent changing or recharging of the battery, which reduces the economic efficiency.

SUMMARY

There may be a desire to provide a gateway and a procedure that is both flexible and economical.

The desire is met by the subject-matter of the independent patent claims. Further embodiments are the subject of the dependent claims, the following description and the figures.

According to a first aspect, a gateway for sensor data forwarding is provided, which comprises a first communication module, a processor and a second communication module. The first communication module is configured to receive sensor data from at least one sensor data source.

The processor is connected to the first communication module and is configured to collect and buffer sensor data and to execute programs that relate to a communication protocol. The second communication module is connected to the processor and configured to send the collected and buffered sensor data. The processor is further configured to switch on the second communication module for sending the collected data and to switch it off after sending the collected data.

This provides a gateway that receives and collects or caches data and only passes it on after it has been collected. The communication modules are each configured to transmit and receive according to a communication protocol, i.e. to provide the corresponding transmit and receive frequencies and modulation types with regard to the hardware, and to modulate the user data received by the processor, e.g. sensor data and management data, such as headers, onto the carrier or demodulate it in the reverse direction and pass it on to the processor for decoding and further processing. For example, the processor may execute several programs simultaneously in a specific manner, so that it can process at least two communication protocols simultaneously. The gateway may also comprise one or more memories for buffering data and storing programs. Two or more processors may also be used, but this may increase the power consumption. The communication modules are configured to support the same or different communication protocols. Advantageously, a short-range protocol is supported for receiving the sensor data and a protocol suitable for long distances is supported for transmitting the collected data. The protocols may be protocols according to a communication standard, but may also be proprietary protocols.

The processor collects the sensor data received by the first communication module according to a first communication protocol by buffering it in a memory. Meanwhile, the second communication module is switched off and can be switched on again, e.g. by switching a supply voltage. Switching off" here also means that parts of the second communication module may be deactivated, so that it is in an energy-saving, hibernation or sleep mode and can be woken up again at any time, e.g. by a command. Between the processor and the communication modules there may be further hardware components, e.g. to condition currents and voltages. As soon as the processor has collected enough data or after a certain time interval, it prepares the sensor data for transmission. For example, the processor encodes the sensor data into a format according to the second communication protocol, switches on the second communication module to send the collected sensor data, and passes the data to the second communication module, which finally sends the data physically, e.g. to a base station of a mobile radio system.

According to an embodiment, the gateway comprises a control unit and the processor is connected to the control unit or the processor is part of the control unit. For example, the processor's power-on and power-off signals can first be sent to the control unit, which then provides the physical signal to switch the communication module(s) on or off. Therefore, "switching on" or "switching off" a communication module by the processor also means that such a possibly existing control unit is used for this purpose.

According to an embodiment, the first communication module is permanently switched on so that it can continuously receive sensor data. The transmission of the sensor data may take place independently of the reception of the sensor data, so that sensor data is transmitted simultaneously or in a reception pause. If sensor data is sent and received simultaneously, new sensor data can already be collected while the collected data is being sent.

According to another embodiment, the processor is set up to switch on the first communication module before receiving the sensor data of the at least one sensor data source and to switch it off after receiving the sensor data. Thus the reception can be clocked and synchronized with the sensor data sources, e.g. the communication devices of measuring units, whereby the reception only takes place at the times at which the sensor data sources transmit the sensor data. For example, the first communication module can be switched on and remain switched on until, from all sensor data sources data of a measuring cycle have been transmitted, or it can be switched on and off separately for each sensor data source to receive a data set from a sensor data source.

According to an embodiment, the gateway also comprises a time module that is configured to turn on the processor before the first communication module is turned on and to turn it off after the first communication module or the second communication module is turned off. In particular, the processor is arranged according to an embodiment to perform the switching on and off of the second communication module and/or the first communication module according to a configurable time sequence based on the time signals of the time module.

Here, "switching off" or "switching on the processor" means that the processor is completely switched off, for example, via the supply voltage, or parts of the processor are deactivated, and the deactivation or activation can be controlled by, for example, the voltage state on a signal line.

In one scenario, for example, the time module may have a signal line that is suitable for providing power to the processor. As soon as the processor is supplied with power, it can initialize or boot and perform communication processing and sensor data collection. The time module could also send a signal to a processor that is in power save or sleep mode, which is fully powered back on by a wake-up signal or command.

According to another embodiment, the time module is set up to synchronize the at least one sensor data source with the time module and to determine a transmission interval of the sensor data source.

The time module may take over further tasks, such as controlling the timing of switching the communication modules on and off, as well as synchronisation with the sensor data sources. Regarding synchronization, for example, a measuring device, i.e. a sensor with a communication unit, can log on to the gateway via NFC or another wireless or wired interface and synchronize with the gateway as part of this process. For this purpose, the time module may have e.g. a real-time clock, timer, logic circuits and/or a simple processor and may also have several signal output lines, e.g. to switch the receive module, the processor and the transmit module on or off separately.

A synchronisation of the sensor data sources with the gateway may still be possible by synchronisation techniques with e.g. signals of satellite navigation or time transmitters like DCF77. Synchronization or re-synchronization can, for example, take place at defined time intervals that are monitored by the time module.

Regarding the time control of the switching on and off of the communication modules, the processor can, for example, query the time module to determine whether a timer has expired. In principle, a timer can also be implemented in the processor and the time module provides the time base, e.g. the clock for the processor and thus the timer in the processor. However, a timer outside the processor, i.e. in the time module, is also required, e.g. to switch on the switched-off processor at predetermined times.

According to an embodiment, the gateway has an integrated energy storage and the gateway is powered by the integrated energy storage for its operation. The integrated energy storage can be e.g. a battery or an accumulator. Due to the configurations described here, the energy requirement is so low that no external energy source may be required. In particular, there may be no need for a wired power supply, making the gateway extremely flexible in the field. According to an embodiment, the gateway obtains its energy or part of its energy from the environment, e.g. by means of a solar module through sunlight, whereby the electrical energy obtained can in turn be stored in a battery or accumulator. The use of a battery may also reduce the circuitry required to provide the required low-voltage operating voltage compared to a mains connection.

According to an embodiment, the processor is set up, the first communication module according to one or more of the network protocols Bluetooth LE, LoRa (Long Range Wide Area Network), Symphony Link. Weightless. Wi-Fi HaLow (WLAN standard 802.11 ah), Dect ULE (Digital Enhanced Cordless Telecommunications Ultra Low Energy). M-Bus Wireless, Wireless HART or Mioty, and to operate the second communication module according to one or more of the communication standards 1G, 2G, 3G or GSM, 4G or UMTS, 5G or IoT, Sigfox, Waviot, RPMA, NB-IOT, LTE-M, or CAT-M1. In addition to these protocols known to the expert, other protocols, e.g. proprietary or future protocols, can also be used.

According to an embodiment, the gateway is integrated into a sensor data source. This saves on hardware, as only one housing is required and possibly the same power source can be used. In addition, the sensor data may be transmitted to the processor via a wired or hard-wired connection, eliminating the need for a wireless communication unit of the sensor. Since the wired transmission in this case uses less energy on both the sensor and the gateway side, the energy consumption is additionally reduced. Furthermore, an additional installation site is saved.

According to an embodiment, the processor is also set up to delete the collected data after sending, so that the memory is emptied and no data already sent is sent again. The memory can be non-volatile memory or volatile memory. An alternative memory type is, for example, a ring memory or ring buffer. In this case the erasing is realized by setting a current, valid memory area and overwriting the old data.

In accordance with a second aspect, a method for receiving and forwarding sensor data in a gateway is provided, in which the gateway comprises a time module, a processor, a first communication module and a second communication module and wherein the time module outputs time values. The method comprises the following steps:

In a step S3 the time value of the time module is compared with a first predetermined value. In the next step S4, sensor data is received by the first communication module. In a further step S5, the received sensor data is collected by the processor and temporarily stored if the time value corresponds to the first predetermined value. In a subsequent step S7 it is checked whether a threshold value for the number of data or a second predetermined time value of the time module is exceeded, and if the threshold value for the number of data or the second predetermined time value is exceeded, the following steps S8-S11 are performed:

S8 Switch on the second communication module by the processor,

S9 Transmission of the buffered data during a transmission phase by the second communication module, S10 Switch off the second communication module by the processor, S11 Deletion of the buffered data by the processor.

Thus, sensor data is collected until a time value is reached or a predetermined amount of data is collected to send the sensor data through the second communication module. The second communication module is switched on by the processor before sending and switched off again by the processor after sending. Afterwards the collected sensor data is deleted and the counter for the number of data is reset, or the time module resets a timer, for example. The time module can also be set up to provide a signal at certain times, for example every full hour, to indicate that the sensor data should be sent.

According to an embodiment, the method before step S3 comprises the following steps:

S2 Starting the processor by the time module and S3 Switching on the first communication module by the processor.

Furthermore, according to this embodiment, after step S3, the method comprises step S6, switching off the first communication module by the processor, and before repeating step S1, step S12, switching off the processor by the time module.

This means that the processor is switched on by the time module before receiving the data of one sensor or the data of all sensors of a measuring cycle. If not enough data have been collected yet or if the time for sending the data by the second communication module has not yet been reached, the processor is switched off again after reception until it is switched on again by the time module for receiving the data of the next sensor or the data of the next measuring cycle. On the other hand, if enough data have been collected, or if the time for sending the data has been reached, the processor remains switched on to send the data via the second communication module and is only switched off again afterwards until it is switched on again by the time module for the next reception.

In accordance with a further embodiment of the method, the reception of sensor data during a sensor data transmission interval in step S4 comprises the reception according to one or more of the network protocols Bluetooth LE, LoRa, Symphony Link, weightless, Wi-Fi, HaLow, DECT ULE, M-Bus Wireless, Wireless HART, or Mioty, and sending the cached data in step S9 means sending according to one or more of the communication standards 1G, 2G (GSM/GPRS/EDGE), 3G (UMTS/HSPA/LTE), 4G (LTE AdvancedPro), 5G (IoT), Sigfox, Waviot, RPMA, NB-IOT, LTE-M, or CAT-M1.

According to a third aspect, a program element which, when executed on a processor of a gateway, instructs the gateway to perform the steps according to the procedure described above.

According to a fourth aspect, a computer-readable medium is provided on which a program element executed above is stored.

Another aspect relates to the use of a gateway described above and below in a sensor, in particular in a level sensor, a point level sensor, a flow sensor or a pressure sensor. The sensor can be set up to collect data from its environment over a low power network and then transmit it to a server at specific times, for example, using a 3G or 5G wireless standard. The sensor can be set up for groundwater management or for rainwater overflow basins. The level curve measured by the sensor is documented, but not transmitted in real time. The measurement data are transmitted, for example, once a week or once a month.

SHORT DESCRIPTION OF THE FIGURES

In the following, examples of how the invention is implemented are explained in more detail using the schematic drawings.

Figure 4:
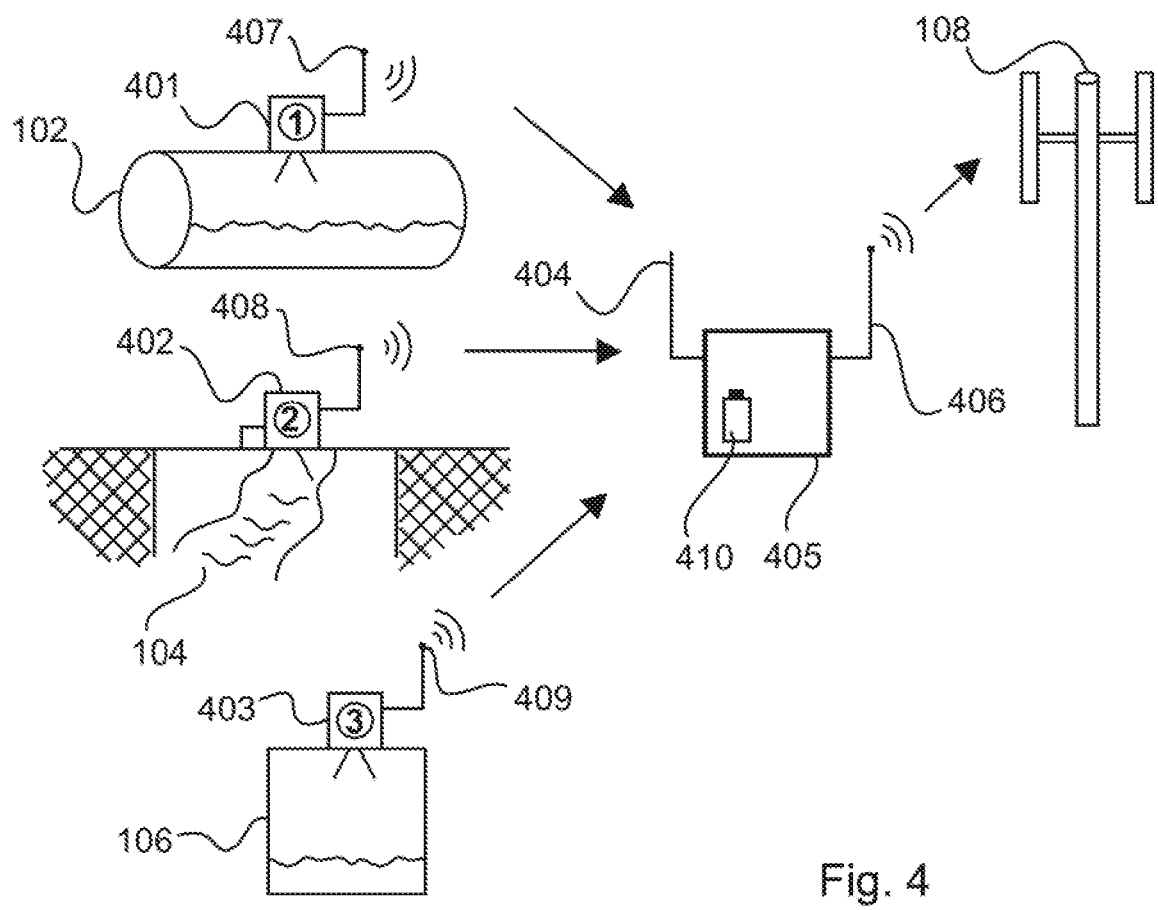
Figure 5:
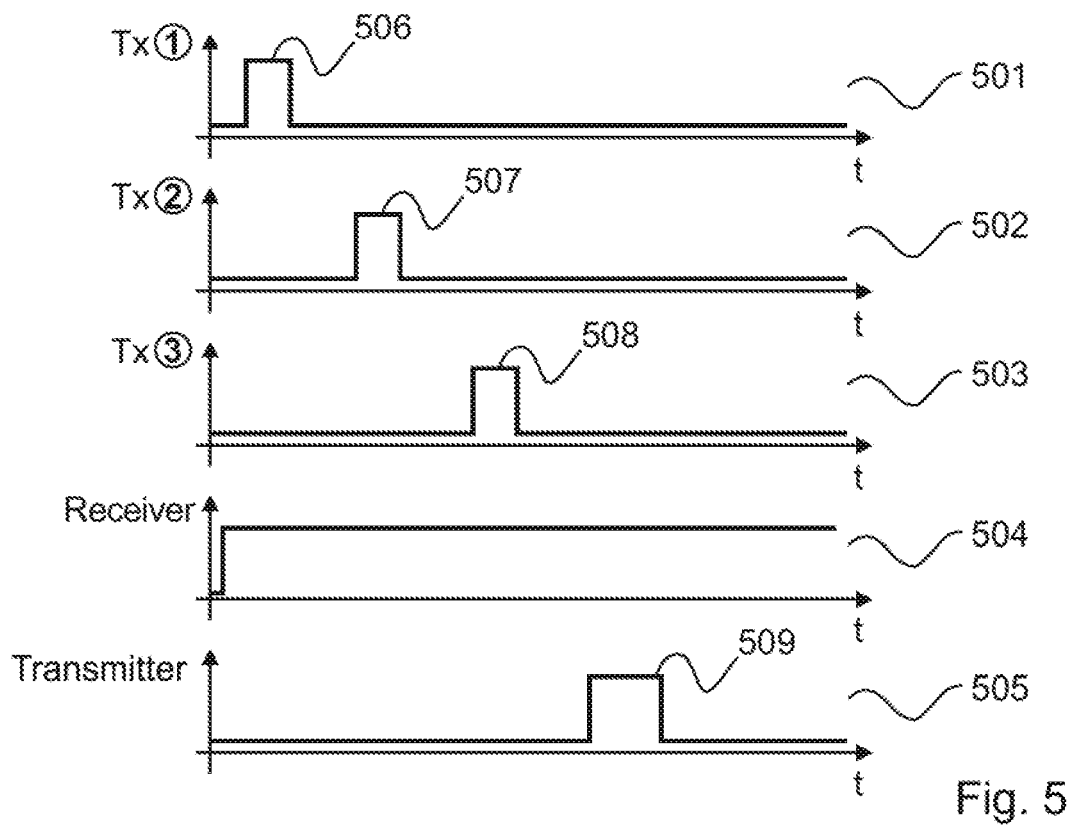
Figure 6:
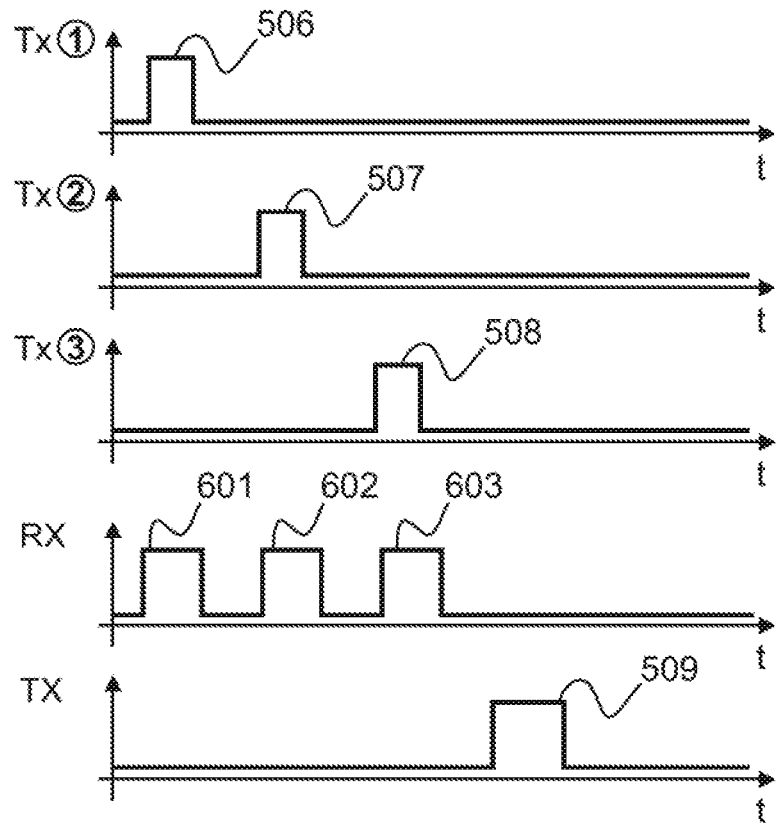
Figure 7:
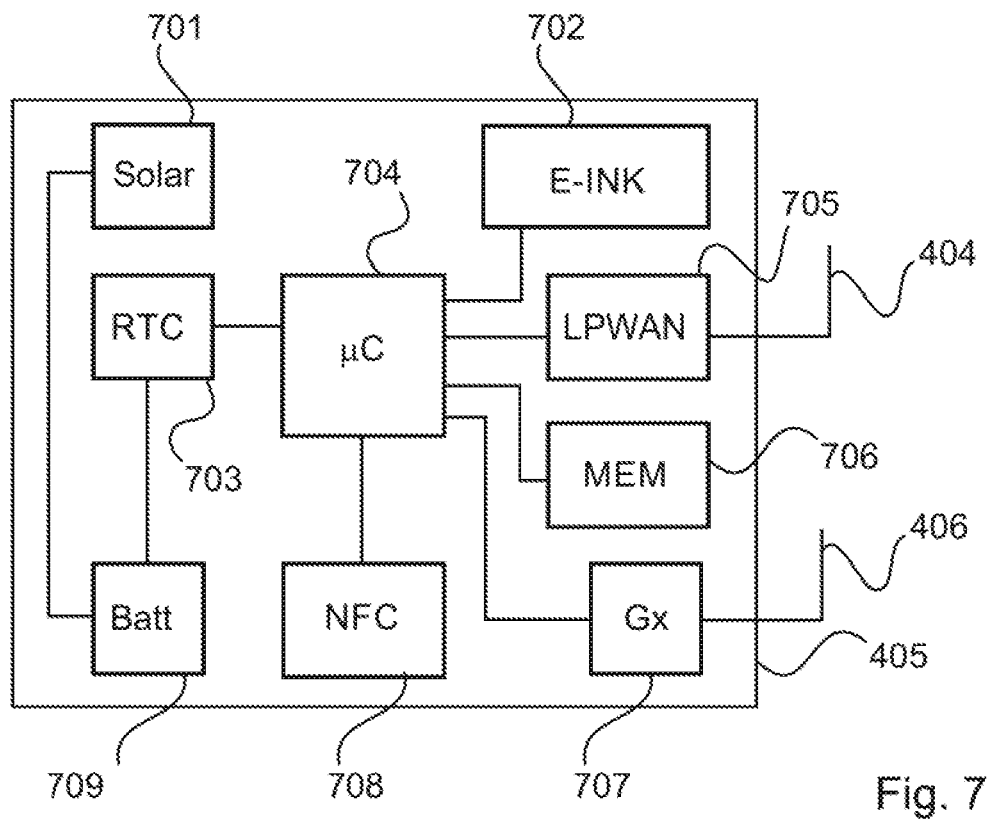
Figure 8:
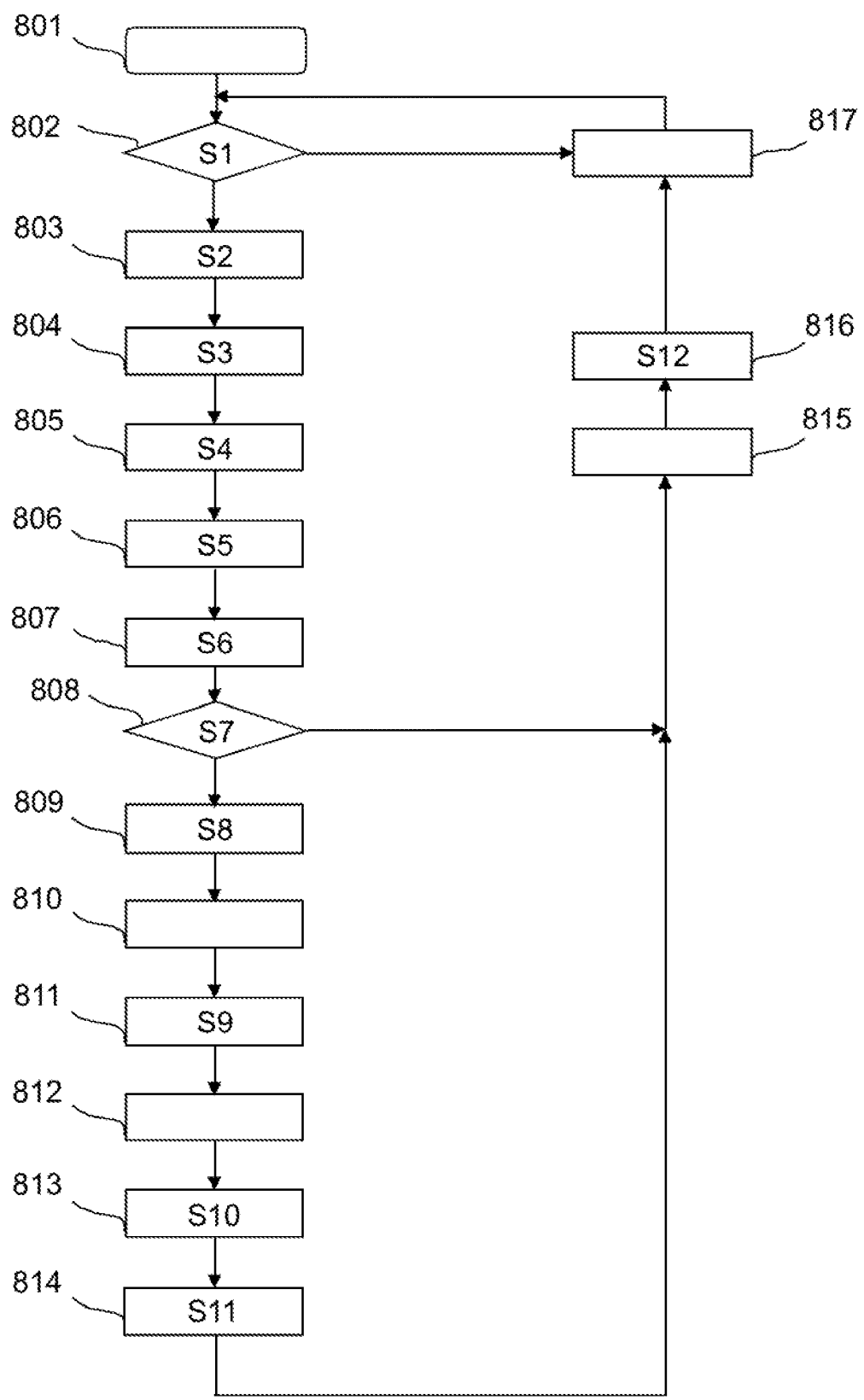

FIG. 4 the acquisition of sensor measurement values according to an execution example, FIG. 5 shows a sequence for operating the gateway according to a first execution example, FIG. 6 shows a sequence for operating the gateway according to a second execution example, FIG. 7 a block diagram of the gateway according to an execution example, FIG. 8 a flow chart according to an execution example.

DETAILED DESCRIPTION OF EMBODIMENTS

Figure 1:
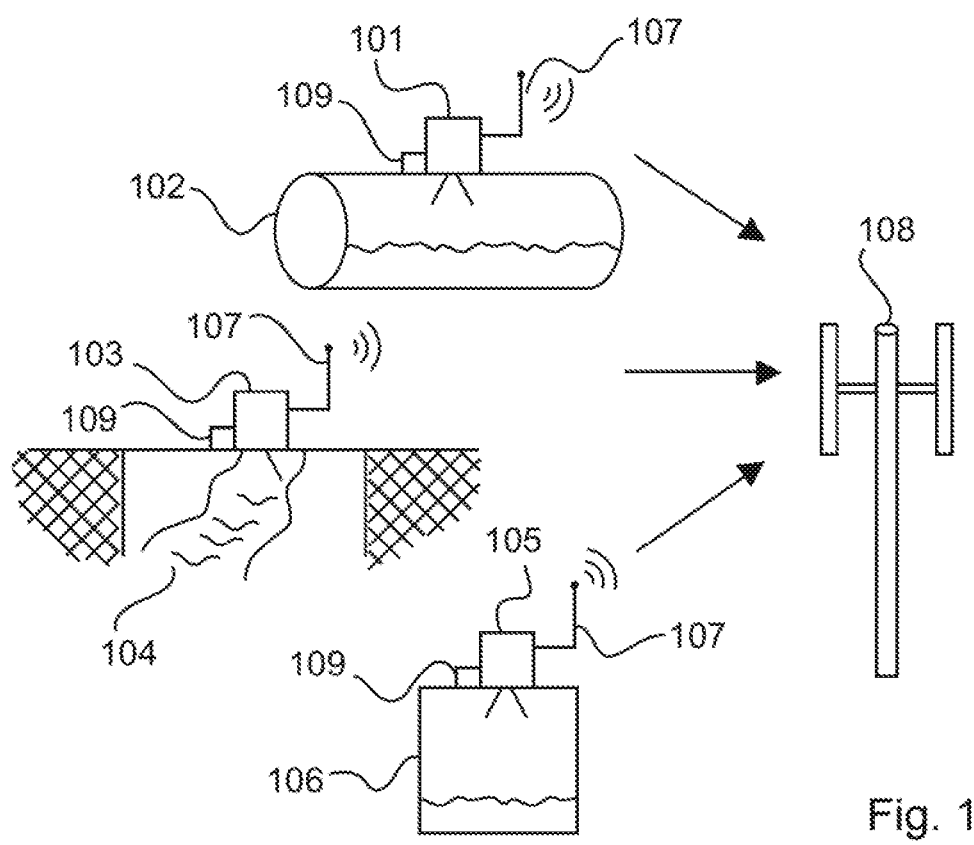
FIG. 1 is an example for the acquisition of sensor measured values.

FIG. 1 shows an embodiment for the acquisition of the measured values of decentralized distributed single sensors 101, 103, 105 The presented example includes a first level sensor 101, which is to detect the level in a storage tank 102, a second level sensor 103, which is to monitor the water level of a river 104, mounted on a bridge, and a third level sensor 105, which is to detect the level in a mobile container 106, for example an IBC (Intermediate Bulk Container) 106. The sensors 101, 103 and 105 can be widely distributed; in this example they can also be positioned at varying distances from each other. A classical acquisition of the measured values with the help of wired systems is difficult to realize due to the local distribution with variable distance. Existing sensors are therefore preferably enabled via extension modules with wireless communication interfaces, preferably with GSM interfaces 107, to transmit their respective measured values wirelessly to a public mobile radio network 108. In general, communication with publicly available mobile networks involves a large number of management bytes, and commercially available mobile modules are also quite energy-intensive. For this reason, operation of sensors 101, 103, 105 is only possible by combining them with externally supplied energy 109. A connection to the power supply system may be provided.

Figure 2:
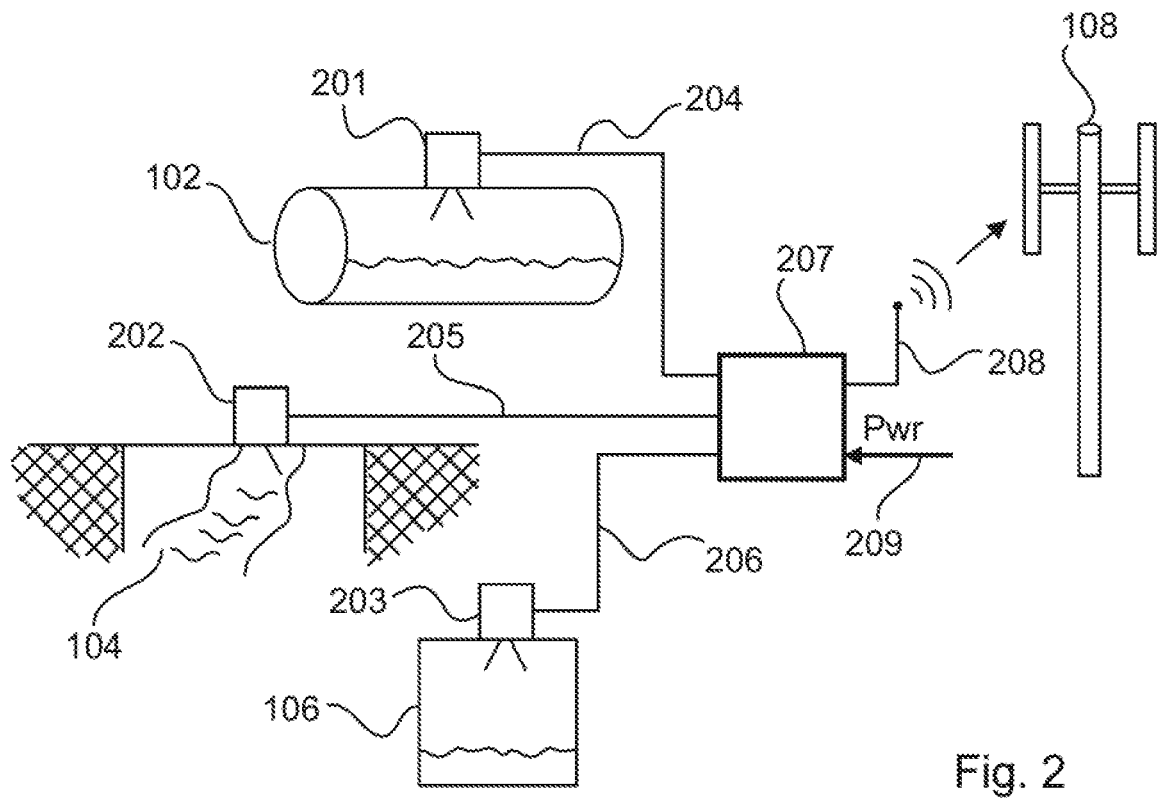
FIG. 2 is another example for the acquisition of sensor readings.

If the local distances between the applications 102, 104, 106 to be monitored are manageable, but the distance to a remote control and/or monitoring device is large, sensors 201, 202, 203 are typically connected as shown in FIG. 2. The central communication interface here is the gateway unit 207, which is supplied with power via a supply line 209. The gateway unit 207 provides energy via several wired interfaces 204, 205, 206 with which the sensors 201, 202, 203 are supplied. The interfaces 204, 205, 206 are usually at the same time communication lines via which the measured values of the sensors are transmitted back to the Gateway 207 in analogue and/or digital form (4 . . . 20 mA according to the Highway Addressable Remote Transducer, HART protocol). The gateway contains a communication module 208, which is connected to an external, publicly accessible radio mast 108 via the mobile phone network. The measurement and/or diagnostic data of the sensors 201, 202, 203 are transferred via the mobile phone network to a cloud not shown here, and are thus available for control and/or monitoring purposes even at remote locations. This device may require a wired communication link 206 to, for example, mobile sensors 203, which considerably restricts the mobility of containers 106.

Figure 3:
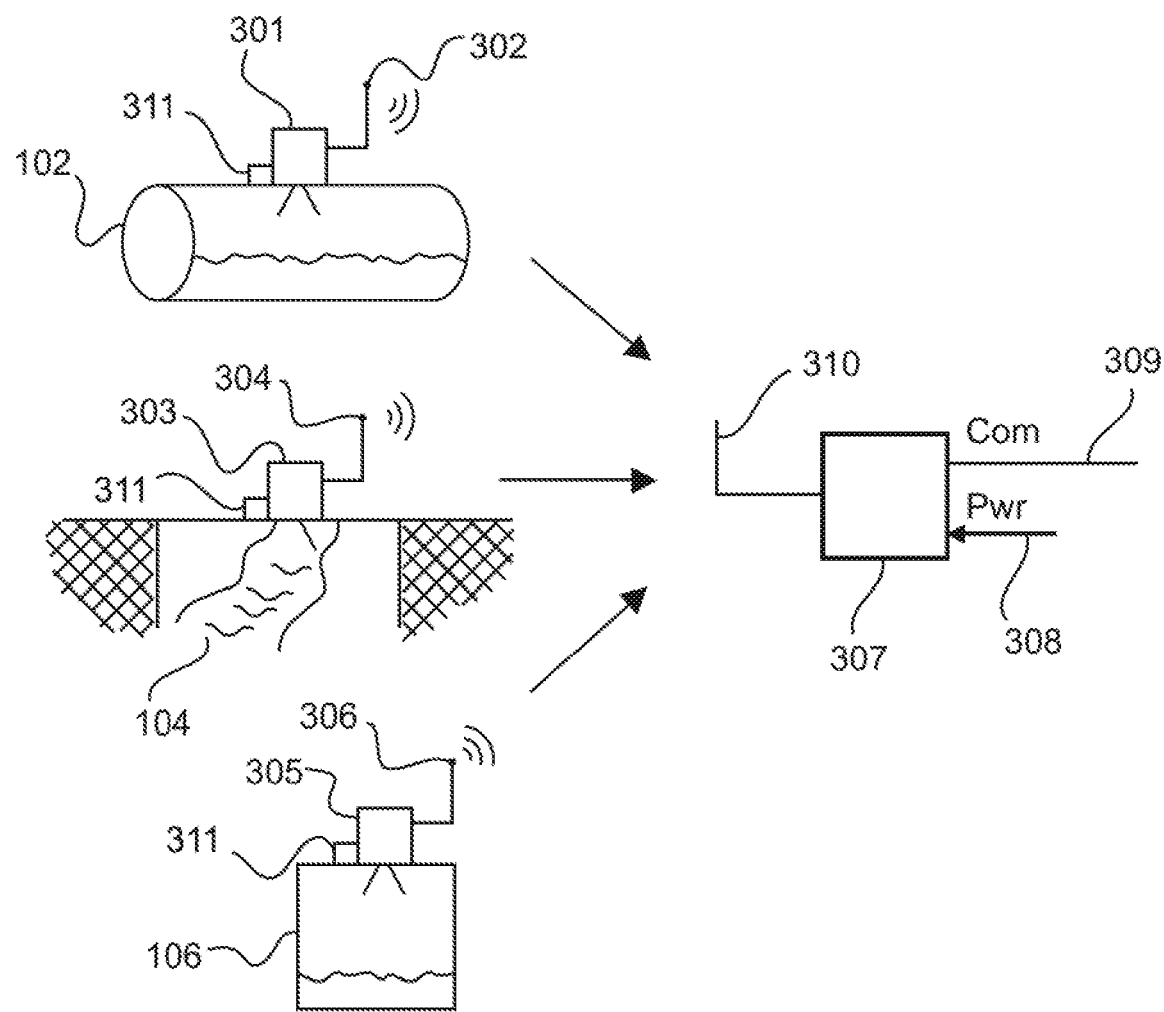
FIG. 3 is a third example for the acquisition of sensor readings.

FIG. 3 shows another example of an arrangement with sensors and a gateway, using improved radio communication on the sensor side, which is made possible by energy-saving circuits. The sensors 301, 303, 305 transmit their respective measured values via an LPWAN (Low Power Wide Area Network) communication module 302, 304, 306 to an LPWAN-capable gateway 307. The energy requirement for this communication is extremely low, which is why the sensors 301, 303, 305 can achieve lifetimes of typically 10 years or more by integrating a battery 311 or rechargeable battery. The LPWAN Gateway 307 can be externally supplied with the power required for operation via a 308 interface, for example by Power over Ethernet. Via a communication line 309, for example a LAN connection 309, the measured values are forwarded to a local network or a globally available cloud.

Since communication via LPWAN can usually bridge several kilometres, an arrangement as shown in FIG. 3 can enable battery operation of sensors 301, 303, 305, which contributes to extremely simple installation and low maintenance. With such an arrangement, it is necessary to install the gateway 307 in the area of a power supply 308. Especially when monitoring rivers, it is often not possible to supply the gateway with power.

FIG. 4 shows an arrangement with sensors and a gateway according to an embodiment. The distributed sensors 401, 402, 403 transmit their measured and/or diagnostic values to the Gateway 405 with the aid of an LPWAN interface 407, 408, 409 or a PAN (Personal Area Network) interface 407, 408, 409. With the aid of a suitable PAN and/or LPWAN interface 404, the data transmitted by the sensors 401, 402, 403 are received and temporarily stored. The distance between the preferably battery-powered sensors 401, 402, 403 and the Gateway 405 can be more than 10 m or even more than a few km. The gateway transmits the cached information at a later point in time using a publicly available mobile network and a suitable communication device 406 to a publicly accessible mobile base station, which forwards the data to a cloud. It may be intended to deactivate the communication unit 404 for receiving data from the sensors 401, 402, 403 while the data is being forwarded to the mobile network 108. In addition, during communication with the mobile phone network, the data from at least two 401, 402, 403 sensors are jointly transmitted to the cloud. By combining these measures, the gateway can be supplied completely from an energy storage device 410 integrated in the gateway and therefore no longer needs to be connected to an external supply 308.

As communication standard 407 for the transmission of data from the sensors 401, 402, 403 to the gateway, Bluetooth LE, LoRa (Long Range Wide Area Network), Symphony Link, Weightless, Wi-Fi HaLow (WLAN standard 802.11 ah), Dect ULE (Digital Enhanced Cordless Telecommunications Ultra Low Energy). M-Bus Wireless, Wireless HART or Mioty are used in particular. The aforementioned standards allow the construction of private networks, i.e. in particular the energy-efficient transmission of sensor data to a remote gateway. As communication standard 406 for the transmission of collected sensor data from a gateway 405 according to the invention to a public communication network 108, standards such as Sigfox, Waviot, RPMA, NB-IOT, LTE-M or CAT-M1 are used in addition to the established mobile radio standards 1G, 2G, 3G, 4G or even 5G. It may also be intended that the Gateway 405 supports several input and/or output standards selected from the standards mentioned above and/or implements several standards simultaneously.

According to an embodiment, radio links are used in accordance with the LPWAN standard, the specifications of which allow the transmission and/or reception communication modules to be deactivated at least temporarily in order to achieve maximum energy efficiency. In connection with a correspondingly implemented control unit integrated in the device 405, an operating mode of the gateway can be realized which can achieve extremely low energy consumption and thus a complete supply of the device 405 from an integrated energy storage 410.

FIG. 5 shows a procedure for operating the gateway 405 according to a first embodiment. In this example, the first communication module (circuitry) 404 according to e.g. the LPWAN protocol is continuously activated 504 after booting the gateway. In a first period 506, the sensor 401 transmits its data to the gateway. This stores the data in an integrated memory area. In a second period 507, the sensor 402 transmits its data. In the same way, the data of sensor 403 are transmitted in a third time period 508 and stored locally in the gateway. The control unit of the gateway now activates the second communication interface (circuitry) 406 in the period 509, and establishes a connection to a publicly available network 108, in order to transmit the previously collected and stored data of the sensors to a cloud in a bundled form and with a higher data rate than in the case of reception. As soon as the data is transmitted, communication unit 406 is deactivated again to save energy resource 410.

FIG. 6 shows a further sequence of operations according to an embodiment, which may be achieved by a combination of hardware and software parts known to the expert within a control unit in the Gateway 405 not shown here. If both the sensors 401, 402, 403 as well as the gateway 405 are time synchronized by the installation of a time base and by control signals exchanged in advance, the control device of the device 405 can activate the LPWAN receiver 404 specifically for the respective transmission phases 506, 507, 508 of the connected or registered sensors 401, 402, 403, and receive and locally store data in the corresponding sections 601, 602, 603. The data is in turn transferred to an external cloud in the time period 509.

FIG. 7 shows the basic structure of a gateway 405 in detail as a block diagram according to an embodiment. The gateway contains a battery and/or a rechargeable battery 709 to provide the energy required for operation. A time module (circuitry) 703, preferably a real-time clock, boots the processor (processing circuitry) 704 at predefinable times 601, 602, 603, 509, which can receive data from at least one sensor via the first communication interface 705, 404 and store it in memory 706. In addition, the processor 704 can read out the collected data from the memory 706 again, and transfer it to a publicly available network via a second communication interface 707, 406. An optional display unit 702 can be used to display status information, whereby an E-Ink display 702 can preferably be provided for this purpose, which can continuously display the information displayed even after the processor 704 and/or the supply voltage has been switched off. It may also be intended to use RFID technology, e.g. with the aid of a NFC (Near Field Communication) unit 708, to simplify in a particularly convenient way the log-on and log-off of sensors 401, 402, 403 as well as the specification of communication time slots 506, 507, 508 by simply bringing the sensors closer to the gateway. If the above-mentioned measures do not achieve the service life of the unit 405 aimed at in the application, the service life of the unit 405 can be extended almost indefinitely by the optional installation of an energy harvesting unit 701, for example a solar module 701.

The components shown above allow the simple and cost-effective implementation of a completely autonomously operated gateway as an intermediary between a private, local sensor network and a public network. It should be noted that the Gateway 405 can also be part of a sensor 401, 402, 403, which can collect and forward the measured values of the sensors in its environment, quasi as a master. It may be provided that the master gateway can automatically detect and integrate the sensors in its environment.

FIG. 8 shows an embodiment of a process that enables particularly energy-saving operation of the unit 405. The procedure starts in the start state 801 and in step S1 802 the real-time clock checks whether a pre-parameterized activation time T_akt 601, 602, 603 has been reached. If this is not the case, a further period of time is waited by switching to process step 816. Otherwise the processor 704 is supplied with voltage and/or activated in step S2 803. This activates the first communication unit 705, 404 in step S3 804 to receive data from a sensor 401, 402, 403 in step S4 805. The data is stored in memory 706 in step S5 806. In step S6 807 the first communication unit 705 is deactivated again to save energy. In step S7 808, a check is made whether there is enough data stored in memory 706 to start a transfer of the collected data to a public network infrastructure. One criterion for this can be the presence of sufficient sensor data. However, it may also be intended to cyclically activate the transmission via the second communication interface 707, 406 in definable time intervals. If not enough data is available, the real-time clock 703 is parameterized with the next activation time 601, 602, 603 in step 815, and the processor 704 is deactivated and/or de-energized in step S12 816. After a waiting time 817, S1 802 is executed again. If, on the other hand, sufficient data is available, the second communication interface 707, 405 is activated after transition to step S8 809, whereupon dial-up to a public network takes place in step 810. A relatively large number of communication bytes are required to transmit logon information, which often amounts to a multiple of the user data of the sensors 401, 402, 403. In step S9 811 the collected data of one or more sensors from one or more measurements of the sensors 401, 402, 403 are transferred to a target server or generally to a cloud server. Since the data rate here is generally higher than the data rate for LPWAN communication via the first communication unit 404, 705, only little time and thus little energy is required. In step 812, gateway 405 logs off from network 108 again and in step S10 813, processor 704 deactivates the second communication unit 707. To start a new data collection, the previous sensor data stored in memory 706 is reset in step S11 814. After transition to steps 815, parameterization of the real-time clock, S12 816, deactivating the processor and 817, waiting for a set time, the procedure starts again from the beginning.

With the principles and embodiment described above, a completely autonomously operating communication gateway can be provided, which draws its energy required for operation completely from at least one integrated energy storage device. In connection with the additionally suggested operating modes, a long life span of the gateway can be realized at the same time.

In addition, it should be noted that "comprehensive" and "having" does not exclude other elements or steps and the indefinite articles "one" or "one" do not exclude a plurality. It should also be noted that features or steps described with reference to one of the above examples of execution can also be used in combination with other features or steps of other examples of execution described above. Reference marks in the claims are not to be considered as restrictions.

The invention claimed is:

1. A gateway for sensor data forwarding, comprising:
first communication circuitry configured to receive sensor data from at least one sensor data source;
processing circuitry connected to the first communication circuitry and configured to collect and temporarily store the sensor data;
second communication circuitry connected to the processing circuitry and configured to transmit the collected and buffered sensor data, wherein
the processing circuitry is further configured to switch on the second communication circuitry to send the collected data and to switch the second communication circuitry off after sending the collected data.

2. The gateway according to claim 1,
wherein the first communication circuitry is permanently switched on.

3. The gateway according to claim 1,
wherein the processing circuitry is further configured to turn on the first communication circuitry before receiving the sensor data of the at least one sensor data source and to turn off the first communication circuitry after receiving the sensor data.

4. The gateway according to claim 1, wherein the gateway further comprises time circuitry configured to switch on the processing circuitry before switching on the first communication circuitry and to switch off the processing circuitry after switching off the first communication circuitry or the second communication circuitry.

5. The gateway according to claim 1, wherein the gateway further comprises an integrated energy storage, and the gateway is powered by the integrated energy storage for operation.

6. The gateway according to claim 1, wherein the processing circuitry is further configured to provide the first communication circuitry according to one or more network protocols selected from a list consisting of Bluetooth LE, LoRa, Symphony Link, weightless, Wi-Fi, HaLow, DECT ULE, M-Bus Wireless, Wireless HART and Mioty, and
wherein the processing circuitry is further configured to operate the second communication circuitry in accordance with one or more communication standards selected from a list consisting of 1G, 2G, 3G, 4G, 5G, Sigfox, Waviot, RPMA, NB-IOT, LTE-M, and CAT-M1.

7. The gateway according to claim 1, wherein the processing circuitry is further configured to perform the switching on and off of the second communication circuitry and/or the first communication circuitry according to a configurable time sequence based on time signals of time circuitry.

8. The gateway according to claim 7, wherein the time circuitry is configured to synchronize the at least one sensor data source with the time circuitry and to determine a transmission interval of the at least one sensor data source.

9. The gateway according to claim 1, wherein the gateway is integrated into the at least one sensor data source.

10. The gateway according to claim 1, wherein the processing circuitry is further configured to delete the collected data after transmission.

11. A method for receiving and forwarding sensor data in a gateway including time circuitry, processing circuitry, first communication circuitry and second communication circuitry, wherein the time circuitry outputs time values, comprising:
comparing a time value of the time circuitry with a first predetermined value;
receiving sensor data by the first communication circuitry;
collecting and buffering sensor data by the processing circuitry when the time value corresponds to the first predetermined value;
checking whether a threshold value for a number of data or a second predetermined time value of the time circuitry is exceeded; and
when the threshold value for the number of data or the second predetermined time value is exceeded:
switching on the second communication circuitry by the processing circuitry, transmitting of the temporarily stored data during a transmission phase by the second communication circuitry, switching off the second communication circuitry by the processing circuitry, and erasing the buffered data by the processing circuitry.

12. The method according to claim 11, wherein the method further comprises, before the receiving of the sensor data, starting the processing circuitry by the time circuitry, switching on the first communication circuitry by the process circuitry, wherein the method further comprises after the receiving of the sensor data, turning off the first communication circuitry by the processing circuitry, and wherein the method further comprises, before repeating the comparing switching off the processing circuitry by the time circuitry.

13. The method according to claim 11, wherein the receiving sensor data during a sensor data transmission interval includes receiving in accordance with one or more of network protocols selected from a list consisting of Bluetooth LE, LoRa, Symphony Link, weightless, Wi-Fi, HaLow, DECT ULE, M-Bus Wireless, Wireless HART and Mioty, and transmitting the buffered data includes transmitting in accordance with one or more of communication standards selected from a list consisting of 1G, 1G, 1G, 1G, 1G, Sigfox, Waviot, RPMA, NB-IOT, LTE-M, and CAT-M1.

14. A non-transitory computer readable medium having stored thereon a program element which, when executed by processing circuitry of a gateway, instructs the gateway to perform the method of claim 11.

15. A gateway for receiving and forwarding sensor data comprising time circuitry;

processing circuitry;

first communication circuitry; and second communication circuitry;

wherein the time circuitry outputs time values, and wherein the processing circuitry is configured to compare a time value of the time circuitry with a first predetermined value, collect and buffer sensor data received by the first communication circuitry when the time value corresponds to the first predetermined value;

check whether a threshold value for a number of data or a second predetermined time value of the time circuitry is exceeded; and when the threshold value for the number of data or the second predetermined time value is exceeded:

switch on the second communication circuitry, instruct transmission of the temporarily stored data during a transmission phase by the second communication circuitry, switch off the second communication circuitry, and erase the buffered data.

* * * * *